July 29, 1969    R. A. MACRISS ET AL    3,458,445
ABSORPTION REFRIGERATION SYSTEM CONTAINING SOLUTIONS
OF MONOETHYLAMINE WITH THIOCYANATES
Filed May 5, 1967    2 Sheets-Sheet 1
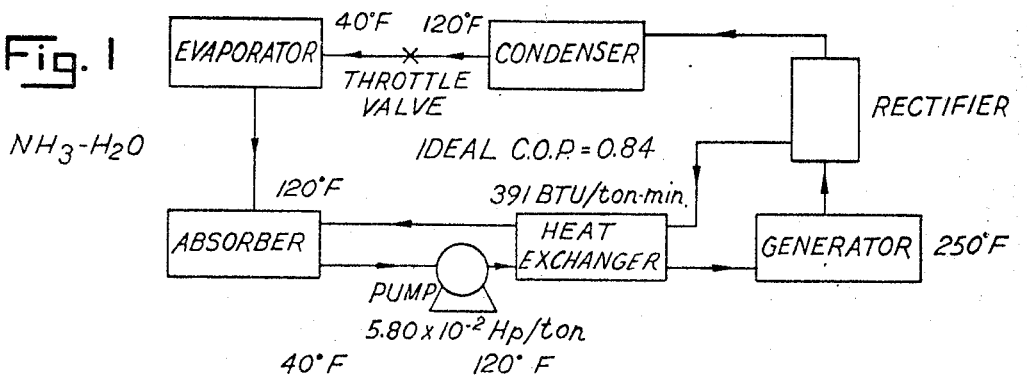
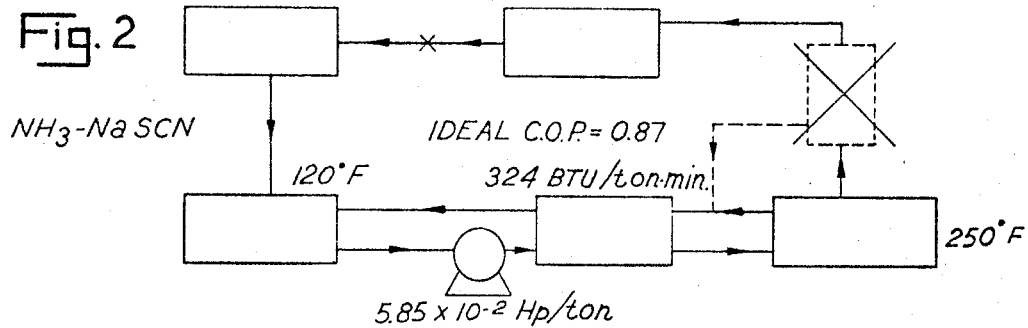
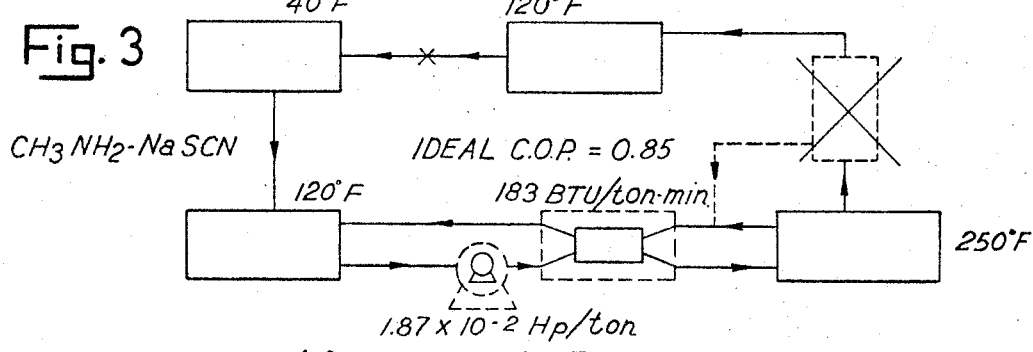
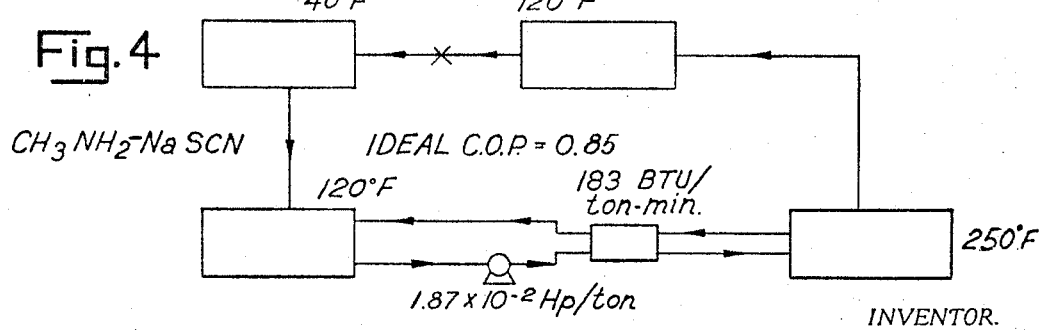
INVENTOR.
ROBERT A. MACRISS,
SANFORD A. WEIL, &
WILLIAM F. RUSH
Bair, Freeman & Molinare
ATTORNEYS VAPOR PRESSURES OF Na SCN-Li SCN-CH$_3$NH$_2$ SOLUTIONS

United States Patent Office 3,458,445
Patented July 29, 1969

3,458,445
ABSORPTION REFRIGERATION SYSTEM CONTAINING SOLUTIONS OF MONOETHYLAMINE WITH THIOCYANATES
Robert A. Macriss and Sanford A. Weil, Chicago, and William F. Rush, Arlington Heights, Ill., assignors, by mesne assignments, to American Gas Association, Inc., New York, N.Y., a not-for-profit corporation of New York
Continuation-in-part of application Ser. No. 541,849, Apr. 11, 1966. This application May 5, 1967, Ser. No. 636,380
Int. Cl. C09k 3/02
U.S. Cl. 252—69
8 Claims

ABSTRACT OF THE DISCLOSURE

Improved working fluids for use with air-cooled absorption-refrigeration systems which (1) give the system a high coefficient of performance, (2) reduce heat exchange area between the generator and absorber, and (3) eliminate the need for a rectification system between the generator and condenser are disclosed. The working fluids disclosed are solutions of monomethylamine with sodium thiocyanate, and mixtures in which the sodium thiocyanate is replaced in part with other thiocyanates of Groups I, II and III (Mendelyeen Periodic Table) metals, and/or mixtures thereof.

Figure 5:
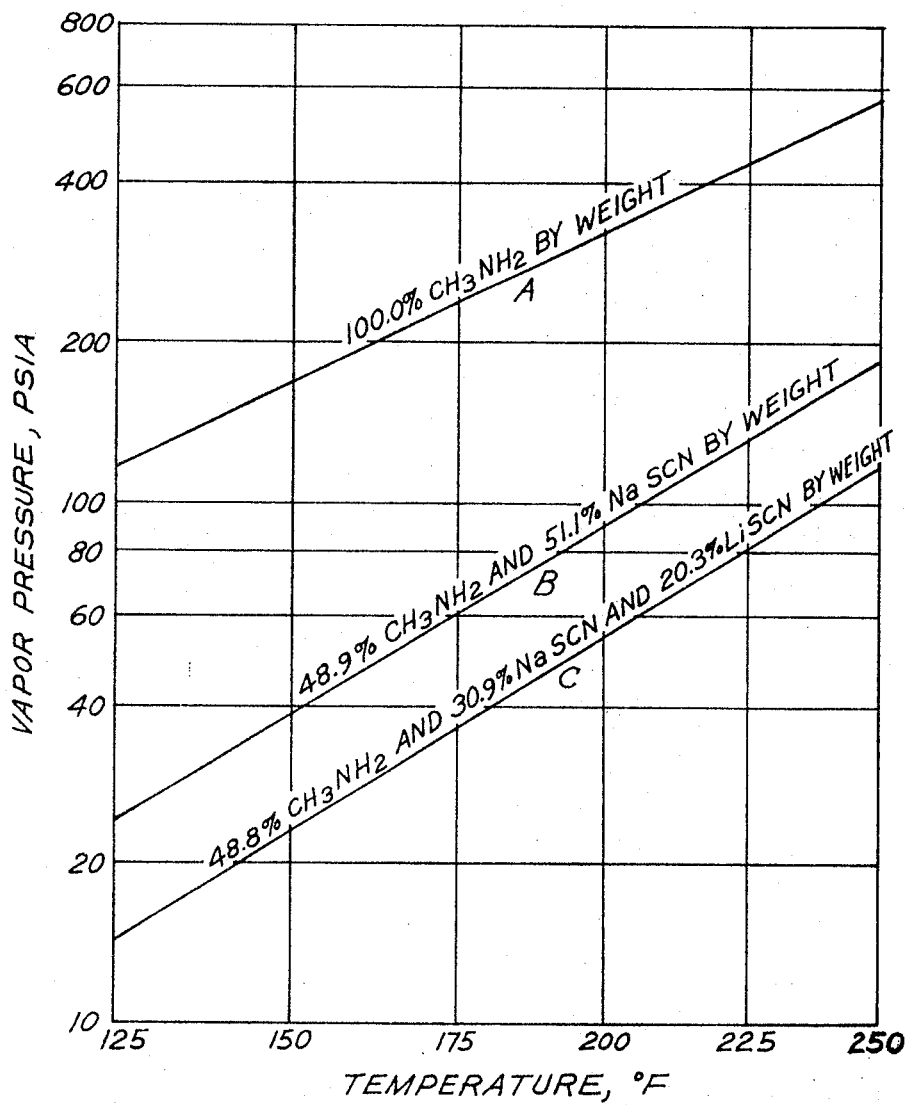

This application is a continuation-in-part of Ser. No. 541,849, filed Apr. 11, 1966 and now abandoned.

Field of the invention

This invention relates to absorption refrigeration and more particularly to an improved working fluid for use with air-cooled absorption refrigeration systems.

By way of background, the absorption cycle uses two fluid streams in a totally enclosed system. One of these fluid streams is the refrigerant, which provides the cooling effect; the other is the absorbent which conveys the refrigerant through part of the cycle. The major components of the system are a generator, condenser, evaporator, absorber, and heat exchanger. The refrigerant passes through all units; the absorbent is confined to movement through the generator, heat exchanger, and absorber.

In operation, a mixture of absorbent and refrigerant is heated in the generator to boil off some of the refrigerant, which rises on vapor to the condenser. The generator and condenser operate at relatively high pressure, so the condensing temperature of the refrigerant is sufficiently high to permit rejecting the latent heat to the ambient air or cooling water. The liquid refrigerant is throttled to lower pressure so it will boil at relatively low temperature in the evaporator and thus absorb heat from the air to be cooled. The vaporized refrigerant passes to the absorber, where it dissolves in cool absorbent solution which has come to the absorber from the generator outlet. The cool solution, now rich in refrigerant, is sent back to the generator to continue the process.

Prior art

In the past, the ammonia-water combination refrigerant-absorbent has been utilized in systems of the type described above. However, this system is rather complicated due to the need for rectification of the refrigerant stream leaving the generator. Because of the relatively high volatility of the absorbent at usual cycle conditions the refrigerant stream leaving the generator comprises a mixture of refrigerant and absorbent. This stream, after leaving the generator, enters the rectification system comprising of a scrubber rectifier, before reaching the condenser. This renders the system more complex to operate, less efficient, and costlier to fabircate. Other problems present in using the ammonia-water combination are the relatively high pump work and heat transfer area in the heat exchanger.

Other working fluids have been employed in the prior art such as a lithium bromide-water combination, an ammonia-sodium thiocyanate combination and various organic fluid mixtures as described in U.S. Patent No. 2,149,947 to Zellhoefer, e.g. methylene chloride and a disubstituted polyglycol derivative.

The above prior art systems all suffer from various disadvantages. The lithium bromide-water system is not particularly adaptable for use with air cooling due to the solubility limitations of lithium bromide in water and the difficulties of crystallization at lower temperatures. The ammonia-water system and the ammonia-sodium thiocyanate system have the disadvantage of requiring high-operating pressures, on the order of 300 to 400 p.s.i., whereas the lithium bromide-water systems require subatmospheric operation pressures. Both high and low operating pressures are undesirable, since they require relatively expensive equipment and involve relatively complex operating procedures.

Other disadvantages of prior art systems include the excessive pump work required in transferring absorber fluid between the generator and absorber, particularly in organic fluid systems. Also, the ammonia-water system, the ammonia-sodium thiocyanate system and the organic fluid systems all have high heat transfer requirements, thus necessitating a large heat exchanger between the absorber and generator sections. This is undesirable for economic reasons. Organic fluid systems further are generally thermally unstable over time and have low coefficients of performance.

THE INVENTION

Objects

It is therefore an object of the present invention to provide a substantially better refrigerant-absorbent combination to be used in an air-cooled absorption refrigeration system than that which has been proposed in the past.

A specific object ofthis invention is to provide a refrigerant-absorbent combination to be used in an air-cooled absorption refrigeration system which gives the system the highest possible coefficient of performance.

Still another specific object of this invention is to provide a refrigerant-absorbent combination which decreases the pump work required to move the refrigerant-absorbent solution in a refrigeration system.

Another specific object of this invention is to provide a refrigerant-absorbent combination for an air-cooled absorption refrigeration system which requires substantially reduced heat exchange area between the generator and absorber components of the system.

Another specific object of this invention is to provide a refrigerant-absorbent combination for use in an air-cooled absorption refrigeration system to eliminate the need for a rectification system between the generator and condenser.

Other objects of our invention will become apparent as it is more fully described hereinafter.

In the drawings:
FIG. 1 shows a schematic diagram of a typical prior art refrigeration system;
FIG. 2 shows another prior art system; and
FIGS. 3 and 4 are schematic diagrams of a typical refrigeration system of our invention; and
FIG. 5 illustrates this invention by showing the vapor pressure vs. temperature curves for two fluid combinations of this invention as compared to pure monomethylamine. system of our invention is compared with an ammonia-water system and an ammonia-thiocyanate system.

TABLE I.—PERFORMANCE OF AIR COOLED SYSTEM

| Design variables | I<br>$NH_3$—$H_2O$ | II<br>$NH_3$—NaSCN | III<br>$CH_3NH_2$—NaSCN | IV<br>$CH_3NH_2$—NaSCN |
|---|---|---|---|---|
| Evap. temp., °F | 40 | 40 | 40 | 40 |
| Cond-Abs temp., °F | 120 | 120 | 120 | 120 |
| Generator temp., °F | 250 | 250 | 250 | 250 |
| Pressure Drop, p.s.i.a | 213 | 213 | 86 | 86 |
| Absorber Conc., wt. percent refrigerant | 44.3 | 44.0 | 66.1 | 50.9 |
| Generator Conc., wt. percent refrigerant | 35.0 | 36.2 | 56.7 | 39.4 |
| Pumping factor, RP | 6.0 | 7.2 | 3.6 | 4.3 |
| Heat of vap., B.t.u./lb | 536 | 536 | 351 | 351 |
| Pump work HP/ton | $5.80 \times 10^{-2}$ | $5.85 \times 10^{-2}$ | $1.84 \times 10^{-2}$ | $1.87 \times 10^{-2}$ |
| Heat exch. load, B.t.u./ton min | 391 | 324 | 183 | 183 |
| Ideal C.O.P. | 0.84 | 0.87 | 0.92 | 0.85 |

Summary

We have now found that a solution of monomethylamine and sodium thiocyanate provides a working fluid with desirable characteristics for air-cooled refrigeration systems. In addition, we have found that combinations of monomethylamine with sodium thiocyanate and other thiocyanates of Groups I, II and III metals provide working fluids which achieve the objects of our invention.

FULL DESCRIPTION

In particular, the working fluid of our invention consists of a solution of monomethylamine and sodium thiocyanate, the sodium thiocyanate being from about 20% by weight to about 65% by weight of the solution. The upper limit of salt concentration is primarily based upon solubility considerations at the temperatures of operation of the system.

We have found that increased effectiveness of the sodium thiocyanate salt may be obtained by substituting for part of the sodium thiocyanate in the solution other thiocyanates of Groups I, II and II (Mendelyeen Periodic Table) metals, such as lithium, potassium, calcium or aluminum. The other thiocyanates can be substituted up to about 49 weight percent of the sodium thiocyanate of the solution. When using the combination sodium thiocyanate and other thiocyanate salt, the working fluid can contain more total salt and can range from about 15% to about 75% salt and corresponding 85% to about 25% monomethylamine. The introduction to the methylamine-sodium thiocyanate system of the thiocyanate additives modify the physical and thermodynamic properties of the solution by increasing the negative deviation of the vapor pressure from ideal behavior and/or increasing the amount of sodium thiocyanate that can be dissolved at a fixed temperature. The specific additives can be added to the methylaminesodium thiocyanate system either singly or in combination to achieve the desired effect. Where the sodium thiocyanate is in part replaced by other thiocyanates of Group I, II and III metals to form a three- or four-component system, the negative vapor pressure deviation is still further increased. In such multi-component systems, the total amount of metallic thiocyanate salt is greater than the total amount of metallic thiocyanate salt in the two component systems, yet the improved thermodynamic properties are retained since the vapor pressure of the multi-component may be less than two-component systems, as seen, for example, in FIG. 5.

Specific embodiments and preferred examples

A representative refrigeration system using the monomethylamine-sodium thiocyanate solution of our invention is shown in the following Table I with typical operating parameters and characteristics. As shown in Table I, the In the above table, the parameters for the monomethylamine-sodium thiocyanate system was derived from extensive laboratory data including pressure-temperature-concentration data for mixtures of monomethylamine-sodium thiocyanate, heat of mixing data, heat capacity data for monomethylamine-sodium thiocyanate solutions, heat capacity data for liquid and vapor monomethylamine, heat of vaporization data for monomethylamine and concentration-crystallization temperature data for mixtures of monomethylamine-sodium thiocyanate. The pumping factor, RP, used in the table, is defined as the pounds of the solution circulated between the generator and absorber per unit time divided by the pounds of refrigerant vaporized per unit time. The pumping factor is thus a measure of the quantity of solution needed for circulation between the absorber and the generator to vaporize one pound of refrigerant.

The drawings show schematically the data which is tabulated in Table I. FIG. 1 illustrates an ammonia-water system operating under the conditions shown in column 1 of Table I. It is noted that such system requires a rectifier between the generator and the condenser to separate vaporous mixtures of ammonia and water.

FIG. 2 illustrates schematically the ammonia-sodium thiocyanate system of column II of Table I wherein the rectifier is not needed as shown by its schematic deletion. FIG. 3 shows schematically the system of our invention showing monomethylamine and sodium thiocyanate as working fluid. The heat exchanger between the absorber and generator is shown reduced in size to illustrate diagrammatically that less heat exchange capacity is necessary as compared to the ammonia-water and ammonia-sodium thiocyanate systems. Shown in dotted lines is a schematic representation of the heat exchange capacity required in the above two systems. The conditions of Column III in Table I represent an initially preferred, operable system within our invention with proper adjustment, and the conditions listed in Column IV of Table I represent a presently preferred embodiment.

Also, shown schematically in FIG. 3 is the reduced pumping requirement needed in our system. The reduced size of pump as compared with the pump shown in dotted lines illustrates the difference in pumping requirement.

FIG. 4 is a similar to FIG. 3 but shows our system without representing the rectifier and shows the heat exchanger and the pump in their relative sizes as compared with the systems of FIGS. 1 and 2.

As can be seen from the drawing and from Table I, the pressure drop in our system is substantially less than the pressure drop in either the ammonia-water or the ammonia-sodium thiocyanate systems. In addition, the pumping factor in our system is about half that in other systems. It also is clear that the pump work required substantially less in our system as is the heat exchanger load. Note also that the ideal coefficient of performance (referred to as C. O. P. in Table I) of our system is within the range or greater than prior art systems.

FIG. 5 shows the vapor pressure characteristics of the two-and three-component working fluid systems of this invention as compared to that of monomethylamine. Curve A of FIG. 5 shows the relationship of the vapor pressure and temperature of monomethylamine. A typical two-component fluid system of our invention, 48.9% by weight $CH_3NH_2$ and 51.1% by weight NaSCN, is shown in curve B and illustrates the negative deviation of the vapor pressure from the behavior of the curve A monomethylamine. Curve C, where part of the NaSCN is replaced by 20.8% by weight of LiSCN, shows a still increased negative deviation possible with three-component systems. Addition of still more LiSCN in place of part of the NaSCN in the curve C system will tend to lower the curve C still further. The thermodynamic efficiency is proportional to the increase in negative deviation of vapor pressure from ideal, and to the total salt content.

Having described our invention, we claim:

1. A working fluid for an absorption refrigeration system consisting essentially of a solution of about 80% to 35% by weight monomethylamine and 20% to 65% by weight sodium thiocyanate.

2. A working fluid for an absorption refrigeration system consisting essentially of a solution of about 85% to 25% by weight monomethylamine and about 15% to about 75% by weight thiocyanate, said thiocyanate being minimally 51% sodium thiocyanate and the balance being a thiocyanate of Group I, Group II, and Group III (Mendelyeev Periodic Table) metal thiocyanates selected from the group consisting of lithium, potassium, calcium or aluminum thiocyanates and mixtures thereof.

3. In an absorption refrigeration process wherein a relatively volatile, chemically and thermally stable refrigerant is alternately absorbed in and expelled from an absorbent, the improvement wherein said refrigerant is monomethylamine and said absorbent is a solution of sodium thiocyanate and monomethylamine.

4. In an absorption refrigeration process wherein a relatively volatile, chemically and thermally stable refrigerant is alternately absorbed in and expelled from an absorbent, the improvement wherein said refrigerant is monomethylamine and said absorbent is a solution of monomethylamine and thiocyanate, said thiocyanate being sodium thiocyanate and at least one Group I, Group II and Group III (Mendelyeev Periodic Table) metal thiocyanates selected from the group consisting of lithium, potassium, calcium or alminum thiocyanates, and mixtures thereof.

5. A working fluid as in claim 2 wherein said member is lithium.

6. A process as in claim 3 wherein said absorbent solution of sodium thiocyanate and monomethylamine comprises about 80% to 35% by weight monomethylamine and 20% to 65% by weight sodium thiocyanate.

7. A process as in claim 4 wherein said member is lithium thiocyanate.

8. A process as in claim 7, wherein absorbent solution comprises about 85% to 25% by weight monomethylamine and about 15% to about 75% by weight thiocyanate, said thiocyanate being minimally 51% sodium thiocyanate and the balance being said thiocyanate selected from lithium, potassium, calcium or aluminum thiocyanate and mixtures thereof.

References Cited

UNITED STATES PATENTS 1,734,278   11/1929   Tandberg _____ 252—69

OTHER REFERENCES

Blytas et al.: "Concentrated Solutions of NaSCN in Liquid Ammonia," Journal of the American Chemical Society, vol. 84 (April 1962), pp. 1075–83.

LEON D. ROSDOL, Primary Examiner

I. GLUCK, Assistant Examiner

U.S. Cl. X.R.

62—112, 119; 252—67

UNITED STATES PATENT OFFICE

CERTIFICATE OF CORRECTION

Patent No. 3,458,445                          Dated July 29, 1969

R. A. Macriss et al

It is certified that error appears in the above-identified patent and that said Letters Patent are hereby corrected as shown below:

In the headings of the drawings, both Sheet 1 and Sheet 2, line 3, that portion of the title reading "MONDETHYLAMINE" should read -- MONOMETHYLAMINE --.

Column 1, line 3, the word "MONOETHYLAMINE" should read -- MONOMETHYLAMINE --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents